United States Patent [19]
Romick

[11] Patent Number: 5,281,020
[45] Date of Patent: Jan. 25, 1994

[54] STACKABLE DRAWER SYSTEM

[76] Inventor: Jerome M. Romick, 170 N. Drexel Ave., Columbus, Ohio 43209

[21] Appl. No.: 779,939

[22] Filed: Oct. 21, 1991

[51] Int. Cl.⁵ .......................................... A47B 47/00
[52] U.S. Cl. ................................ 312/308; 220/4.03; 312/249.11
[58] Field of Search .................... 220/4.03, 4.26; 312/107, 234.1, 234.5, 249.11, 249.8, 334.8, 334.13, 298, 308

[56] References Cited

U.S. PATENT DOCUMENTS

| | | | |
|---|---|---|---|
| 3,485,408 | 12/1969 | Benesch | 220/4.26 |
| 3,527,515 | 9/1970 | Grau et al. | 312/234.1 |
| 3,647,101 | 3/1972 | Hensch et al. | 220/4.03 |
| 4,212,415 | 7/1980 | Neely | 220/4.26 X |
| 4,285,559 | 8/1981 | Koch | 312/107 X |
| 4,572,368 | 2/1986 | Miller et al. | 220/4.03 |
| 4,723,679 | 2/1988 | Sinchok et al. | 220/4.03 |
| 4,998,967 | 3/1991 | Box | 220/4.03 |

Primary Examiner—Peter R. Brown
Attorney, Agent, or Firm—Wood, Herron & Evans

[57] ABSTRACT

A base drawer which has been modified to allow non-permanent attachment of an extender to increase the vertical dimension of the drawer. Additional extenders can be stacked one on top of the other, in order to increase the vertical dimension of the drawer to any height desired. In one embodiment, the base drawer has three receptacles along the top edge of its two side walls, and each extender has three matching locking prongs along the lower edge of its two side walls as well as three receptacles along the upper edge of each side wall which allow extenders to be stacked one on top of the other. When one or more extenders are attached to a base drawer (i.e., receptacles and prongs are interlocked), the receptacles and prongs on each side of the resulting stackable drawer assembly are in line.

6 Claims, 2 Drawing Sheets

STACKABLE DRAWER SYSTEM

BACKGROUND OF THE INVENTION

This invention relates to a drawer for a medication dispensing cart; such as, the medication dispensing cart claimed in U.S. patent application Ser. No. 07/662,750 which is incorporated by reference herein. Because of their open construction and use of a guide rail system, carts like these are able to house drawers of various vertical dimensions. Such versatility is especially important in the medication dispensing industry because there are numerous medication dispensing systems on the market which necessarily require storage drawers of varying heights.

Medication dispensing carts, like those disclosed in the previous reference, are used extensively in extended care facilities (i.e., nursing homes) and in general and acute hospitals. These carts are typically pushed from one patient's room to another and contain such things as patient medication and equipment for checking a patient's vital signs. Because different institutions, and in fact different wings within the same institution, can have different patient requirements and administrative needs, there is a demand for various configurations of such dispensing carts. In response to this demand, a wide variety of such dispensing carts have been introduced into the market. Such facilities typically provide health care to a diverse patient population with a wide variety of medical needs. Such a patient population necessitates maintaining the availability of a wide spectrum of medication and equipment in order to provide for day-to-day patient requirements.

In response to this spectrum of medical needs, the industry has in the past and continues today to provide customers with the flexibility to choose, for any given cart configuration, drawers with different vertical dimensions. Thus, each dispensing cart can be tailored to each individual customer's requirements.

Until the present invention, all such drawers had permanent vertical dimensions which required each manufacturer to be able to produce a wide variety of such drawers, with the manufacturer, or distributor, necessarily having to keep an inventory of each variety (i.e., various vertical dimensions) or else risk not having a requested drawer on hand. In addition, if a customer wished to change the vertical dimension of any drawer they were using, each such drawer would have to be replaced. Because they typically do not stock such replacement drawers, customers would be forced to wait until the new drawer was shipped and received before their needs could be satisfied.

SUMMARY OF THE INVENTION

The objectives of the present invention are to eliminate the need for stocking a wide variety of drawer sizes, cutting down on inventory and manufacturing costs, while at the same time insuring that the right drawer for each customer's individual requirements will be available at any time.

The above objectives are attained by providing a stackable drawer system which includes a base drawer and one or more vertical drawer extenders, with each extender being basically a bottomless replica of the base drawer. Each base drawer is adapted to allow an extender to be securely but not permanently attached thereto, in order to increase the vertical dimension of the drawer to any desired incremental height. Each extender is adapted to allow attachment to either a drawer or another extender. Thus, any number of extenders can be stacked one on top of the other allowing for great flexibility in the final vertical height of the drawer.

A feature of the invention resides in the spaced apart locking receptacles along the upper edge of each base drawer's side walls and similarly spaced apart locking prongs along the lower edge of each extender's side walls. This structure provides the means for interlocking an extender to a drawer.

Another feature of the invention resides in the spaced apart locking receptacles along the upper edge of each extender's side walls. These receptacles are basically mirror images of those found on each upper edge of the base drawer. This structure enables multiple extenders to be stacked one on top of the other to create a drawer of any given incremental height.

Another feature of the invention has been to mold a stabilizing rim into the lower edges of each extender's back and side walls. This rim extends below the extender's front wall and telescopes within the back and side walls of a drawer or another extender to further interlock the subject components together.

Another feature of the invention is a finishing plug which can be inserted into the receptacles of a base drawer, when extension is not desired, or the uppermost extender in a drawer assembly.

The foregoing structure enables each extender to be attached by hand to either a drawer or another extender without the need for any tools. Detachment may require the use of a tool, such as a screwdriver, to disengage the locking prongs.

The flexibility of the present invention will not only aid the manufacturers and distributors of such dispensing carts, it also gives customers the option of altering the drawers they have in order to fit any subsequent changes in their needs without necessarily having to purchase new drawers. For example, assuming that the base drawer and each extender are both 3" high, a customer having a cart with two 6" drawers, a 9" drawer and a 3" drawer could reposition one extender from the 9" drawer to the 3" drawer resulting in four 6" drawers.

The present invention will become more readily apparent from the following detailed description taken in conjunction with the accompanying drawings in which:

BRIEF DESCRIPTION OF THE DRAWINGS

FIG. 1B is an enlarged perspective view of the encircled area 1B of FIG. 1 illustrating a locking prong and part of the stabilizing lip for the extender;

DETAILED DESCRIPTION OF THE INVENTION

Figure 1:
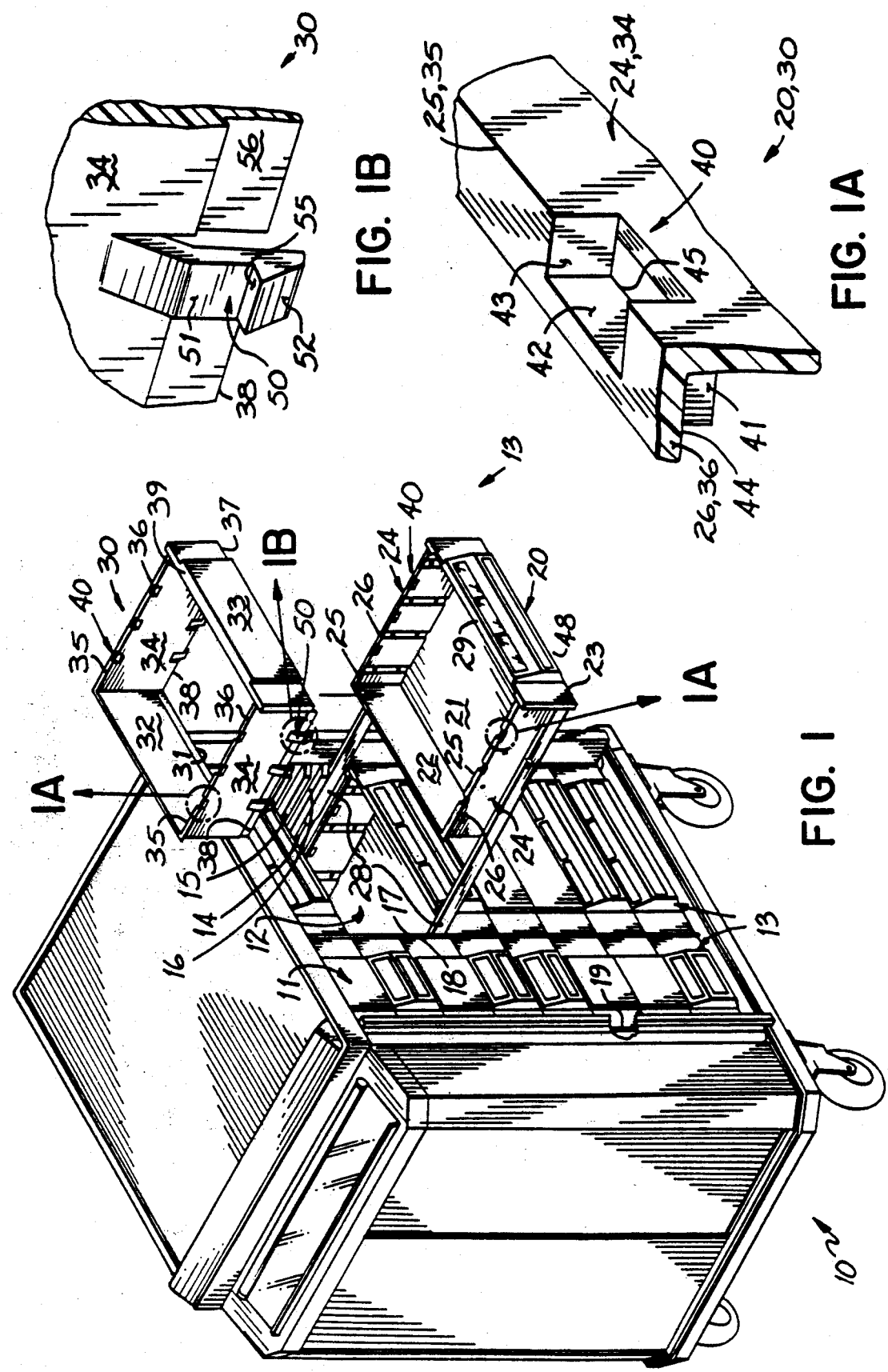
FIG. 1 is a perspective view of a cart with a disassembled base drawer and extender in line for insertion into the FIG. 1A is an enlarged perspective view of the encircled area 1A of FIG. 1 illustrating a receptacle for either a drawer or an extender, the receptacle being viewed from the inside surface.

FIG. 1 shows a representative cart 10. The cart has two compartments 11 and 12 for storing drawers 13. Each compartment can house two sets of drawers, one on either side of the cart. Compartment 11 is shown filled with drawers 13 and compartment 12 is shown with a disassembled drawer 13 about to be inserted into one side of cart 10. A series of spaced apart alternating grooves 14 and ribs 15 run horizontally up the vertical walls 16 and 17 of compartment 12 as well as the vertical walls 18 and 19 of compartment 11. Each of the grooves 14 are formed between any two successive ribs 15.

Each drawer 13 consists of at least a base drawer 20 and may include one or more vertical drawer extenders 30. Each base drawer 20 has two side walls 24 with horizontal guide rails 28 attached longitudinally along the length of each side wall 24 and extending behind the drawer's back wall 22. When a drawer 13 is inserted into or removed from either compartment 11 or 12 the guide rails 28 travel along the corresponding grooves 14 on respective vertical walls of each compartment. Each side wall 24 of a base drawer 20 has an upper edge 25 with a means 40 for interlocking said base drawer 20 with the extender 30. Each extender has two side walls 34, with lower edges 38. Each lower edge 38 has a means 50 for interlocking with corresponding locking means 40 located on the upper edges 25 of the base drawer's side walls 24.

Referring to FIGS. 1, 1A and 1B, a representative base drawer 20 is shown without the accompanying extender 30 being attached. The base drawer 20 has a bottom 21, back 22, front 23 and two side walls 24. The upper edge 25 of each side wall 24 has a laterally projecting flange 26 with three spaced apart locking receptacles 40. Each receptacle 40 is a rectangularly shaped hollow boss that forms a conduit through the flange 26 with three walls 41, 42 and 43, where each wall extends below the flange undersurface 44.

A representative vertical drawer extender 30 is shown before attachment to a base drawer 20. The extender 30 has a back 32, front 33, and two side 34 walls. The lower edge 38 of each extender side wall 34 has three outwardly flaring locking prongs 50 which are each positioned directly below and in line with a corresponding receptacle 40 on the upper edge 35. Each prong 50 comprises a depending leg 51, having a rectangular cross-section, that is molded integrally with and projects outwardly from the extender side wall 34. The leg 51 terminates with a tapered end 52 which forms a shoulder 55 serving as a detent for locking the prong 50 into a receptacle 40. A stabilizing rim 56 is formed into the lower edge 38 of each side wall 34 and the lower edge 31 of the back wall 32. The entire rim 56 and part of the lower portion of the side 34 and back walls 32 extend below the lower edge 37 of the front wall 33 (see FIG. 2).

Each upper edge 35 of both extender side walls 34 also has a flange 36 and receptacles 40 like those found on the upper edges 25 of the drawer's side walls 24. The duplication of this structure on both the drawer and extender allows this stackable drawer system to be of modular construction.

Figure 2:
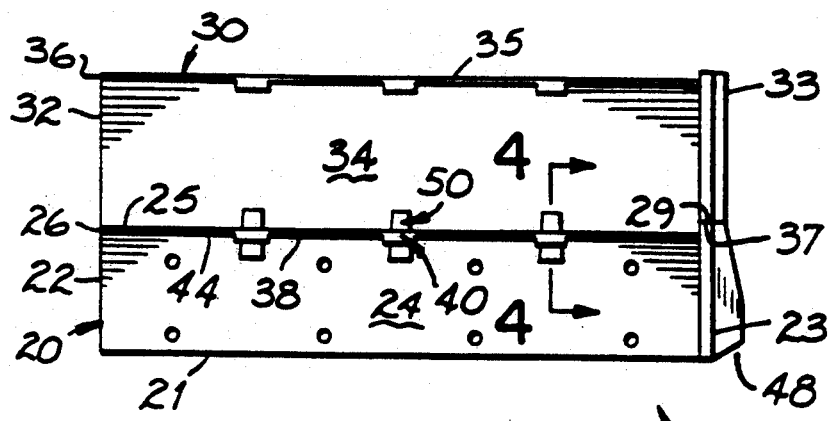
FIG. 2 is a side view of an assembled base drawer and extender.
Figure 3:
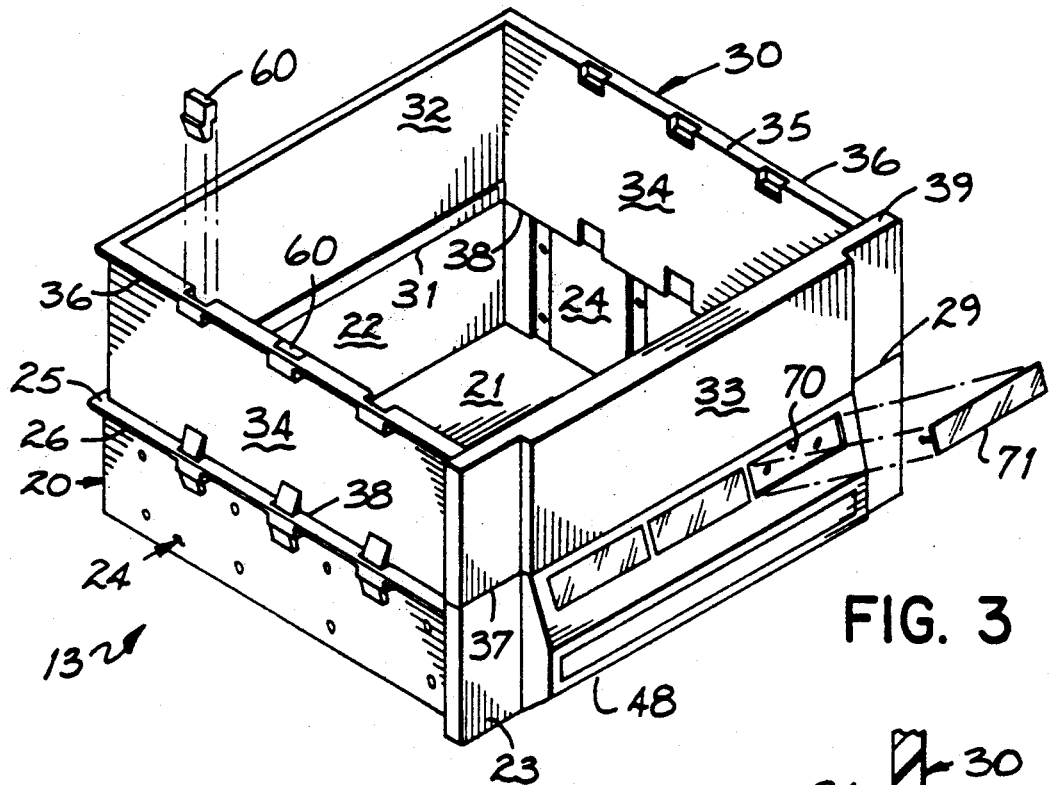
FIG. 3 is a perspective view of an assembled base drawer and extender.
Figure 4:
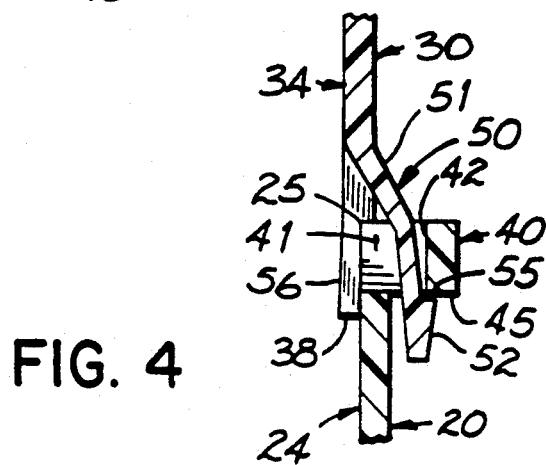
FIG. 4 is an enlarged cross-sectional view taken on line 4—4 of FIG. 2.

Referring to FIGS. 2, 3 and 4, each locking prong 50 is alignable with and insertable into a corresponding receptacle 40, with the rim 56 telescopically insertable within the back 22 and side 24 walls of the drawer 20, or the back 32 and side 34 walls of another extender 30. During the stacking of an extender 30 onto a drawer 20, or another extender 30, the tapered end 52 of each prong 50 is deflected inward by the inner surface of the receptacle wall 42 until the tapered end 52 projects out of the receptacle 40 and the shoulder 55 comes in contact with the lower edge 45 of the receptacle 40, thus locking the extender 30 in place. In this locked condition, the rim 56 is at least in close proximity, if not in contact, with the inner surface of each side and back wall.

Because of the resilient nature of the plastic material used to mold the extender 30 and the high width to thickness ratio of each prong leg 51, each prong 50 easily deflects during insertion and springs back once the prong shoulder 55 has passed through the receptacle 40 and seated against surface 45.

As an option, a finishing plug 60 can be used to fill in the receptacles 40 of a drawer 20 or the top extender 30 (see FIG. 3).

Referring to FIGS. 1, 2 and 3, a handle 48 may be formed from and project out of the front wall 23 of the base drawer 20. An area 70 may also be formed on the outer surface of the drawer front wall 23 for receiving a replaceable label holder 71.

The drawer front wall 23 has an upper edge 29 which projects above the upper edges of its back 22 and side 24 walls. Likewise, the extender front wall 33 has an upper edge 39 which projects above its back 32 and side 34 walls. The front walls of both the drawer 20 and extender 30 also have side edges which project beyond their respective side walls. Referring to FIGS. 2 and 3, the lower 37 and upper 39 edges of the extender front wall 33 each have the same profile as that found on the upper edge 29 of the drawer front wall 23.

The stackable drawer system of FIGS. 1-4, is exemplary of one of a wide variety of drawer dimensions and configurations that can be created using the basic concept of a base drawer and one or more extenders.

Other variants are within the scope of the invention. These variants will, however, use the common basic elements of a base drawer and one or more vertical drawer extenders.

From the above disclosure of the general principles of the present invention and the preceding detailed description, those skilled in the art will readily comprehend the various modifications to which the present invention is susceptible. Therefore, we desire to be limited only by the scope of the following claims and equivalents thereof:

We claim:

1. A vertical drawer extender for mounting onto a stackable base drawer having two side walls, a back wall and a front wall with an upper edge, said extender comprising:

a front, back and two side walls, each of the walls of said extender having an upper and lower edge, the upper edge of each of the side walls of said extender having a laterally projecting flange with a plurality of spaced apart rectangularly shaped locking receptacles in each flange, the lower edge of each of the side walls of said extender having three outwardly flaring locking prongs integrally formed thereof, each of said prongs being alignable with and insertable into a corresponding receptacle of either a stackable base drawer or another extender, each of said prongs having a depending leg, with a rectangular cross-section, said leg terminating with a tapered end which forms a shoulder serving as a detent which in engageable and lockable with a corresponding receptacle, the lower edges of the back and side walls of said extender project below the lower edge of the front wall of said extender, a stabilizing rim being formed along the lower edge of the side and back walls of said extender, said rim having an undercut surface, wherein said surface can telescope within the side and back walls of the drawer or another extender, the side edges of the front wall of said extender project beyond the side walls of said extender and the upper edge of the front wall of said extender projects above the upper edges of the back and side walls of said extender, and the lower edge of the front wall of said extender having an outer profile matching that of the upper edge of the front wall of the drawer.

2. A combination, comprising:

a stackable base drawer having a back, front and two side walls and a bottom, each of the walls of said rawer having an upper edge, the upper edge of the front wall of said drawer being above the upper edges of the back and side walls of said drawer, and the front wall of said drawer having side edges projecting out beyond the side walls of said drawer, a flange projecting laterally out from the upper edge of each of the side walls of said drawer having a plurality of spaced locking receptacles formed therethrough; and a vertical drawer extender having a back, front and two side walls, each of the walls of said extender having a lower and upper edge, a flange projecting laterally out from the upper edge of each of the side walls of said extender having a plurality of locking receptacles formed therethrough, the lower edge of each of the side walls of said extender having a plurality of outwardly flaring locking prongs integrally formed thereof, each of said prongs being alignable with and insertable into a corresponding receptacle of said stackable based drawer, each of said prongs having a detent which is engageable and lockable with a corresponding receptacle, a stabilizing rim projecting below the lower edge of the back and side walls of said extender, said rim having an undercut surface for telescoping within the side and back walls of said drawer.

3. The combination of claim 2 in combination with a cart having two spaced vertical walls and a series of spaced apart alternating grooves and ribs running horizontally up each of said vertical walls, one of said grooves being formed between two successive ribs, said two spaced vertical walls defining a compartment for housing a plurality of drawer and extender combinations, and a guide rail attached longitudinally along the length of each of the side walls and extending behind the back wall of said plurality of drawers housed in said cart, whereby when such drawers are inserted into or removed from said compartment the guide rails of each of said plurality of drawers housed in said cart travel along corresponding grooves on said vertical walls.

4. The combination of claim 3 wherein the locking receptacles of the uppermost extender of each of said plurality of drawer and extender combinations housed in said cart has a finished plug engaged therein.

5. A stackable drawer for use in a cart having two spaced vertical walls and a series of spaced apart alternating grooves and ribs running horizontally up each of said vertical walls, one of said grooves being formed between two successive ribs and the two spaced vertical walls defining a compartment for housing a plurality of said drawers, said stackable drawer comprising:

a base drawer having aback, front and two side walls and a bottom, each of the walls of said drawer having an upper edge and the upper edge of the front wall of said drawer being above the upper edge of the back and side walls of said drawer, and said front wall having side edges projecting out beyond said side walls, a flange projects laterally out from the upper edge of each of said side walls and a plurality of rectangularly shaped locking receptacles are formed therethrough, a guide rail being mounted longitudinally along the length of each of said side walls and extending behind said back wall, whereby when said drawer is inserted into or removed from the compartment in the cart, said guide rails travel along corresponding grooves on the vertical walls of the compartment, and said front wall having a hollow portion forming a handle for said drawer and an outer surface with at least one rectangularly shaped depression formed on said surface for receiving a label holder.

6. A vertical drawer extender for mounting onto a stackable base drawer having a back wall, two side walls, and a front wall with an upper edge, said extender comprising:

a front, back and two side walls, each of the walls of said extender having an upper and lower edge, a flange projecting laterally out from the upper edge of each of the side walls of said extender with a plurality of locking receptacles formed therethrough, the lower edge of each of the side walls of said extender having a plurality of outwardly flaring locking prongs, each of said prongs having a detent which is engageable and lockable with a corresponding receptacle of either a stackable base drawer or another extender, a stabilizing rim projecting from the lower edge of the back and side walls of said extender, wherein said rim can telescope within the side and back walls of a stackable base drawer or another extender, the front wall of said extender having side edges projecting out beyond the side walls of said extender.

* * * * *